UNITED STATES PATENT OFFICE.

HARRY WILLIAMS CHARLTON, OF JONES POINT, NEW YORK.

PLASTIC ARTICLE AND PROCESS OF PRODUCING THE SAME.

1,242,422.      Specification of Letters Patent.      Patented Oct. 9, 1917.

No Drawing.      Application filed May 22, 1917. Serial No. 170,331.

*To all whom it may concern:*

Be it known that I, HARRY WILLIAMS CHARLTON, a citizen of Canada, residing at Jones Point, in the county of Rockland and State of New York, have invented certain new and useful Improvements in Plastic Articles and Processes of Producing the Same; and I do hereby declare the following to be a full, clear, and exact description of the invention, such as will enable others skilled in the art to which it appertains to make and use the same.

This invention relates to a process of producing plastic articles as well as a self-hardening cementing material which is useful in the making of said articles, especially composite brick, and has for its object to provide said cementing material and articles in a manner more efficient and less costly than has been heretofore proposed.

With this and other objects in view the invention consists in the novel steps and combinations of steps constituting the process, and in the novel composition of matter constituting the product, all as will be more fully hereinafter disclosed and particularly pointed out in the claims.

In carrying out this invention, I preferably finely sub-divide feldspar or other basic potash-bearing silicate rock material and add thereto a suitable proportion of lime whereupon the mass is heated and digested with water under pressure until a substantial portion of the potash present has been dissolved out, whereupon the insoluble residue is separated from the liquors and constitutes the above mentioned cementing material.

As a specific example of the carrying out of this process, I may take say 1000 pounds of finely divided rock material, add there 1000 pounds of lime, and mix the same with say 10,000 pounds of water, whereupon the mixture thus produced is heated in an autoclave at a pressure above say 200 pounds to the square inch, and preferably about 225 pounds to the square inch, for say three hours or until substantially all the silicates present have been decomposed and formed into calcium compounds.

After the digestion is thus completed, the above residues may be filtered out from the liquors carrying the alkalis and any excess of lime that may be present will be found to have profoundly changed its physical characteristics.

It will be found that said lime will have approximately the formula of $(CaO)_2.H_2O$ instead of $CaO.H_2O$ and further, its specific gravity will be found to be less than either the normal hydrate or the oxid CaO. This said modified lime will be further found to constitute an exceedingly plastic spongy mass which is self-hardening, and which readily mixes with the calcium silicates and aluminates or calcium aluminum silicates resulting from the above digestion. This said modified lime together with the said silicates and aluminates also forms an exceedingly efficient binding material when mixed with silicious material, such as sand, ground rock, etc., and therefore it is of great utility as a constituent in the manufacture of composite brick, as well as in the manufacture of other plastic articles. As a matter of fact, the said calcium aluminum silicates, resulting from the above digestion process, may be used in the manufacture of brick, etc., without any admixture of said modified lime. It may also be used alone without any admixture of silicious material for hard finishes, stucco, etc. In the manufacture of brick I prefer to employ from 30 to 60 parts of said silicate cementing material with from 70 to 40 parts of silicious material, but of course, these proportions may be widely varied.

In the making of composite brick after the proper proportions of cementing material is mixed with the sand, the mixture is suitably formed into bricks by passing it through any suitable brick making machine, and the formed bricks are then subjected to the action of steam, for suitable periods, at pressures from say 100 pounds to 135 pounds to the square inch in the manner well known, whereupon the brick making process is completed.

It will thus be seen that the finished brick is composed essentially of sand and one or more silicates and aluminates of calcium mixed with alkali aluminates according to the particular rock material employed in the beginning. If sand alone is digested with the lime in about the proportions above specified, I obtain a beautiful snow white calcium silicate binding material suitable for brick making purposes, while if clay, feldspar, mica, sericite, etc., are digested with the lime, a beautiful snow white material containing compounds of calcium and aluminum, etc., is likewise obtained, and in all cases the finished brick is made up of a silicious material and calcium compounds formed as the result of a digestion process which subsequently hardens into an efficient binder.

Stated in other language, the original silicate material of the rock breaks down under the digestion process with the formation of silicates and aluminates of a lower silicate ratio, which form a matrix in which the sand particles become finely embedded. Crystallized hydrate of lime is also observed in the matrix, which probably comes from the above mentioned modified lime. In addition the microscope discloses numerous unaltered grains of the original rock material which serve to fill in the spaces between the sand grains and to thus make the binding matrix material more efficient as a cement. During the self-hardening process the cementing material seems to develop a large quantity of compact, tightly adhering, amorphous, silicate material which is not found in ordinary sand lime brick.

In this brick no lime is employed as such in the mixture with sand, although a greater or less quantity of the above mentioned modified lime may, when desired, be mixed with the above silicate binder. When such modified lime is employed, I prefer to use say about 3 parts of modified lime to 97 parts of silicate binder. A convenient way to obtain the modified lime mixed in the binder is to increase the original proportions of lime in the digester.

It is obvious that those skilled in the art may vary the details of the process as well as of the product without departing from the spirit of the invention and therefore I do not wish to be limited to the above disclosure except as may be required by the claims.

What I claim is:—

1. The process of producing a binding material for use in making plastic articles which consists in heating and digesting with lime silicon bearing material at a pressure and for a time sufficient to convert a substantial portion of said material into a calcium compound containing silicon; and separating out said compound, substantially as described.

2. The process of producing a binding material for use in making plastic articles which consists in heating and digesting with lime rock material containing silicon and aluminum at a pressure sufficient and for a time sufficient to form calcium compounds of said silicon and aluminum having cementing properties; and suitably recovering said compounds, substantially as described.

3. The herein described cementing material containing compounds of calcium and silicon formed as a result of a digestion process and possessing self hardening properties which are increased under the action of steam, substantially as described.

4. The herein described cementing material obtained as a product of the heating and digestion of potassium and aluminum bearing silicate rock material with lime under pressure exceeding 190 pounds to the square inch consisting of a white mass composed essentially of compounds of calcium, silicon and aluminum, and having self-hardening properties, substantially as described.

5. The herein described cementing material obtained as the product of a digestion process and containing lime having substantially the formula $(CaO)_2.H_2O$ mixed with a material containing calcium and silicon in a state of chemical combination, substantially as described.

6. The herein described plastic article consisting of a suitable proportion of silicious material mixed with a cementing, self hardening material obtained as a product of a digestion process and containing calcium and silicon in a chemically combined state, substantially as described.

7. The herein described brick consisting of a suitable proportion of sand mixed with a self hardening material formed as the result of a digestion process and containing calcium, aluminum and silicon in a state of chemical combination, substantially as described.

In testimony whereof I affix my signature.

HARRY WILLIAMS CHARLTON.